April 7, 1964 M. LIPPMANN 3,127,763
COMPACT CASCADE IMPACTOR
Filed July 19, 1961
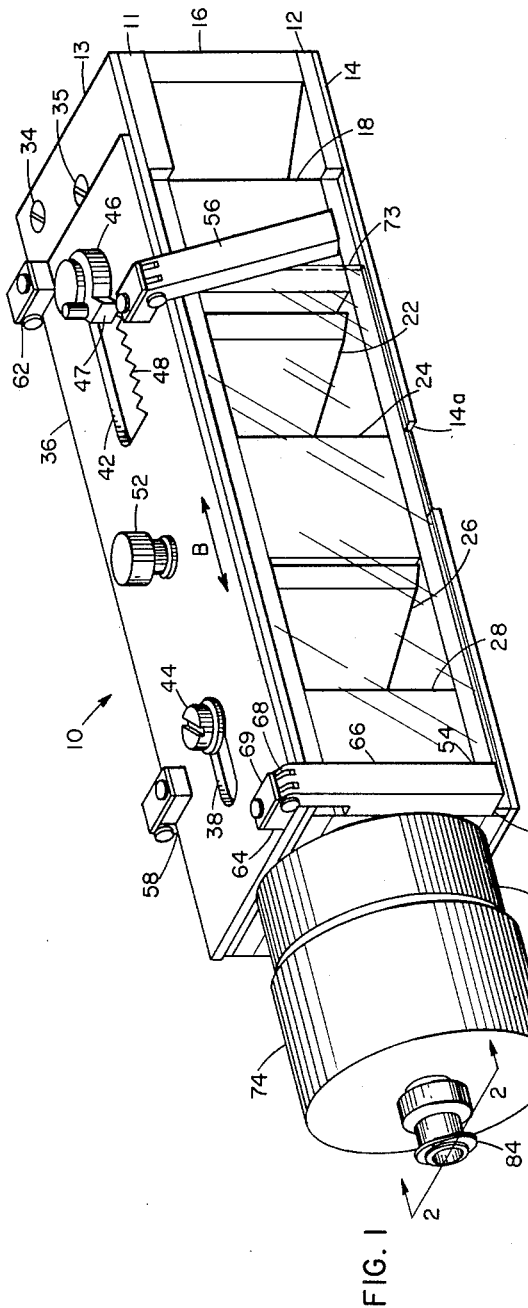
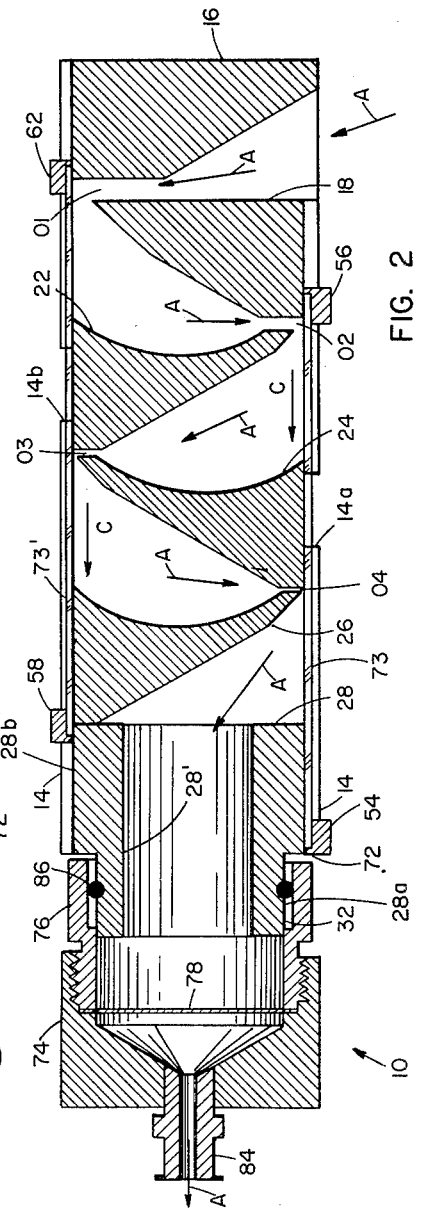
INVENTOR.
MORTON LIPPMANN

United States Patent Office 3,127,763
Patented Apr. 7, 1964

3,127,763
COMPACT CASCADE IMPACTOR
Morton Lippmann, Mount Vernon, N.Y., assignor to the United States of America as represented by the United States Atomic Energy Commission
Filed July 19, 1961, Ser. No. 125,282
2 Claims. (Cl. 73—28)

The present invention relates to a compact cascade impactor for particle collection and analysis and more particularly to a compact cascade impactor designed specifically for large scale particle sampling programs under industrial conditions.

As pointed out in my paper, "Review of Cascade Impactors for Particle Size Analysis and a New Calibration for the Casella Cascade Impactor" in the American Industrial Hygiene Association Journal for October, 1959, cascade impactor analysis of particles has many significant advantages over other methods. In a device of this type, a series of high velocity jets in cascade or series are utilized to collect and analyze the particles in air or other aerosols. Each of the jets directs the air against a collection plate at a progressively higher velocity. As a result, each stage collects smaller particulate than the preceding stage.

Cascade impactors in use today are laboratory instruments of optical quality and delicate construction in which, for example, a separate slide is utilized for each impaction stage and for each collection taken. Usually the slides are not conveniently removable, and in many other respects, including size and cost, are not suitable for industrial or field use on a large scale.

This invention makes it possible for the first time to use an instrument of the principle just described in the field under a variety of adverse conditions. The cascade impactor embodying the principles of this invention is a rugged instrument capable of collecting all particles below 25 microns, capable of easy loading and unloading of the particle collecting slides, and is quickly and readily cleaned either in the laboratory or in the field. It is a compact arrangement in which many collections may be taken on only two slides without removing the slides or disassembling the instrument. The collection plates not only collect the particle samples, but also enclose and seal portions of the particle path and collect more than one size fraction of the particles on each plate, thereby permitting four impaction stages to be enclosed in a volume heretofore capable of enclosing two or less. Efficiency of the impactor as compared to other impactors is improved by causing a change in direction of almost 180° at each impaction stage as compared to the customary 90° in earlier impaction devices.

It is, therefore, a principal object of this invention to provide a cascade impactor of compact and simple construction suitable for field and industrial use.

It is another object of this invention to provide a cascade impactor capable of collecting particles of all sizes below 25 microns.

Another object is to provide a cascade impactor of improved efficiency and field handling characteristics such as ease of cleaning, loading and unloading of collecting slides, and usefulness in large-scale sampling programs.

Other advantages and objects of this invention will hereinafter become more readily apparent from the following description of a preferred embodiment of this invention taken with the accompanying drawing in which:

FIG. 1 is an isometric view of a preferred embodiment of this invention;

FIG. 2 is a section view along 2—2 of FIG. 1.

Referring to FIG. 1, compact cascade impactor 10 is seen to consist of a pair of side plates 11 and 12 having cover plates 13 and 14, respectively, which have bolted therebetween as shown, spaced chamber members 16, 18, 22, 24, 26 and 28. Cover plate 14 is provided with a pair of notches 14a and 14b for a purpose to be later described. Member 28 has a cylindrical hole 28' through its center, a circular extension 28a, and a rectangular outer section 28b fitted between side plates 11 and 12. These chamber or body members are shaped and arranged as illustrated to provide a path through impactor 10 as indicated by arrows A. Conventional means such as screws 34 and 35 may be utilized to assemble and hold the parts together in a rigid structure.

A rectangular slide plate 36 rests on cover plate 13 for movement as indicated by double-headed arrow B. A pair of slots or openings 38 and 42 having guide pins 44 and 46, respectively, are provided to guide and limit the movement of plate 36. In addition, pin 46 has a spring loaded pawl 47 for engagement with notches 48 along one side of slot 42 to permit the movement of plate 36 in controlled increments in the direction indicated by arrows C in FIG. 2. A knob 52 extending from plate 36 is used to move slide plate 36 which is illustrated in its final position. Pawl 47 must be lifted to return slide plate 36 in the direction opposite that of arrow C to its initial or first collection position.

Slide plate 36 is provided with two pairs of positioning arms 54, 56 and 58, 62. These positioning arms are staggered, as illustrated, for a purpose to be later evident. Positioning arm 54 has a stationary portion 64 bolted or welded to plate 36 and a hinged portion 66 for pivoting about hinge 68. Hinge 68 is provided with a spring plate 69 to bias arm 54 into either the closed position shown or the fully open position as is understood in the art. Arm 54 also has a flange or lip 72 against which one end of the particle collection slide 73 abuts. Positioning arm 56 is similar in construction except that the lip is on the opposite side, facing lip 62 of arm 54. Collection slide 73 is thus held between the two lips of arms 54 and 56 so that when slide 36 is moved, collection slide 73 will be moved also. Notches 14a and 14b facilitate the lifting and removal of collection slide 73 and the collection slide 73' on the other side of impactor 10. Positioning arms 58 and 62 are similar in construction for supporting collection slide 73' therebetween. Collection slides 73 and 73' may be standard microscope glass specimen slides which thereby can be stored and shipped in conventional crates used for such articles.

At one end of impactor 10 a cylindrical endpiece 74 provided with an outlet pipe 84 for the aerosol is threaded into engagement with a cylindrical filter holder 76 to hold filter 78 in place as illustrated. Holder 76 is force-fit on the circular extension 32 of unit 28, with an O-ring seal 86 compressed therebetween to effect sealing desired. Outlet 84 is designed to fit or connect to the inlet of a pump (not shown) to obtain the flow of aerosol at desired pressure drops through impactor 10.

Referring particularly to FIG. 2, impactor 10 is shown in section with particle collection slides 73 and 73' mounted for collection with arrows A indicating as noted the path of the aerosol through the instrument. Glass slides 73 and 73' are coated on the inside with an adhesive layer of silicone grease or other suitable material to insure the efficient collection of the dry particles and to seal the instrument to prevent air leakage.

The aerosol in entering and leaving the impactor 10 as shown by arrows A passes through a series of rectangular nozzles or orifices $O_1$, $O_2$, $O_3$ and $O_4$. These orifices are formed by the chamber members 16–28 making up the sidewalls of the various chambers as already described and the orifices become successively smaller in size as illustrated. At the outlet of each orifice, where maximum aerosol velocity is reached, the aerosol is forced to make an almost 180° change in direction, with a portion of either slide 73 or 73' facing the aerosol jetting from the orifices. Thus, at orifice $O_1$, only the largest particles are unable to negotiate the turn and these are impacted against the slide forming a deposit therein in the shape of a line parallel to orifice $O_1$ at approximately its thickness. At orifice $O_2$, somewhat smaller than orifice $O_1$ with resulting aerosol higher velocity, smaller particles are impacted. This process is continued until the aerosol, upon emerging from orifice $O_4$, contains only the smallest particles and these are retained by filter 78.

A particular feature of this device is the slide mechanism already described. This arrangement permits collection slides 73 and 73' to be moved in suitable increments such as 1/16" over a travel of about 1/2" to permit up to nine different samples to be taken for each orifice and a total of two orifices on each slide. It will be appreciated from the description above that each particle collection opposite each orifice is in the shape of a strip. If the slides are moved an increment as permitted by notches 48 in the direction of arrows C after each deposit, the deposit will be retained opposite the chambers and thus are not smeared by the movement of the slide mechanism. In one impactor, built according to this invention, nine deposits were obtained opposite each orifice. Each slide then contains eighteen samples and a total of two slides 73 and 73' which are easily removed from impactor 10 for insertion in the usual microscope slide mounting crates for shipping and later analysis.

In order to utilize impactor 10, it must be calibrated empirically by direct microscopic sizing of the particles collected on each impaction stage in accordance with well-known techniques. This procedure is described in detail in my previously-mentioned article in the AIHA Journal in connection with the Casella cascade impactor and is not a part of this invention. To illustrate the accuracy which can be expected by an instrument embodying this invention, a generalized calibration was made for an impactor of this type applicable to dusts with densities between 0.8 and 20 grams/cm.$^3$ and for any sampling flow rate between 2 and 40 liters/minute. The accuracy of the calibration was checked by comparing cascade impactor sample results with size analyses performed on simultaneously drawn membrane filter samples. The results from five such tests, each performed at a different sampling rate, are shown in Table I. The agreement, it will be noted, is excellent and well within industrial requirements.

TABLE I

*Results—Simultaneous Membrane Filter and Cascade Impactor Samples*

| Sampling Rate, l.p.m. | Membrane Filter—Mass Median Diameter | Cascade Impactor—Mass Median Diameter |
|---|---|---|
| 4.8 | 4.0 | 4.2 |
| 10.0 | 3.4 | 3.7 |
| 13.0 | 3.6 | 3.0 |
| 17.5 | 3.1 | 3.0 |
| 23.0 | 3.6 | 3.4 |

To illustrate the compactness obtained by this invention, the particular embodiment described above has overall dimensions of 1 3/8" x 1 1/2" x 6". The body of the instrument is aluminum and the total weight is only ten ounces.

To clean impactor 10 in the field, slides 73 and 73' are merely removed from their support after lifting positioning arms 54, 56, 58 and 62, thereby exposing the entire inside of the instrument. Further, impactor 10 contains nothing that requires gentle care or handling beyond insuring that the inside surfaces are not damaged.

It is thus seen that there has been provided a cascade impactor which is especially useful for efficient field survey sampling. The device is suitable for the rough estimation of particle size distribution of airborne materials commonly encountered in industry. By appropriate choice of sampling flow rate and the use of the manual slide movement mechanism, it is possible to collect a substantial number of samples which will provide reliable particle size estimates under almost all operating conditions. Because of the relatively small size of the instrument and the ease of sample handling, large numbers of samples can be taken in a reasonably short period of time.

While only a preferred embodiment of the invention has been shown and described, it is understood that many variations may be made without departing from the principles of this invention as defined in the appended claims.

What is claimed is:

1. A cascade impactor for collecting particulate from an aerosol comprising an elongated main body consisting of a row of spaced members with chambers therebetween, means for holding said members rigidly in assembly, the chamber between each adjacent pair of members terminating in a nozzle formed by a portion of each of said adjacent pair of members, each said chamber and nozzle extending completely through said main body at substantially right angles to the long axis of said impactor with the next successive chamber and nozzle being reversed in orientation, thereby forming a row of nozzles along one side of said main body and a row of nozzles along the opposite side of said main body, and a particle collection plate opposite each row of nozzles, each nozzle having one of its forming portions touching its collection plate to prevent aerosol flow therebetween and its other forming portion spaced from its collection plate to permit aerosol to flow from each nozzle to the next successive chamber on the opposite side of the adjacent member with the spaced forming portion, thereby forming within said main body a passage for said aerosol successively through chambers and nozzles with a jetting of said aerosol from each nozzle against the opposite collection plate, said aerosol changing its direction of flow into the successive chamber resulting in impaction of particles from said aerosol on said collection plates, said nozzles in the direction of aerosol flow being successively smaller in cross-section to result in the impacted particles becoming distributed by size on said collection plates.

2. The impactor of claim 1 in which said nozzle forming portions are parallel, said nozzles being rectangular in cross-section with said holding means closing off the sides of said nozzles between said collection plates.

References Cited in the file of this patent

UNITED STATES PATENTS

| 1,128,758 | Cheesman | Feb. 16, 1915 |
| 2,246,349 | Crum | June 17, 1941 |
| 2,538,116 | May | Jan. 16, 1951 |
| 2,947,164 | Orr | Aug. 2, 1960 |